(12) United States Patent
Baynard

(10) Patent No.: US 9,475,457 B1
(45) Date of Patent: Oct. 25, 2016

(54) GOLF CART LOCKING SYSTEM

(71) Applicant: David Baynard, Manning, SC (US)

(72) Inventor: David Baynard, Manning, SC (US)

( * ) Notice: Subject to any disclaimer, the term of this patent is extended or adjusted under 35 U.S.C. 154(b) by 304 days.

(21) Appl. No.: 14/186,669

(22) Filed: Feb. 21, 2014

(51) Int. Cl.
 *B60R 25/08* (2006.01)
 *B60R 25/00* (2013.01)
 *E05B 13/00* (2006.01)
 *E05B 17/14* (2006.01)

(52) U.S. Cl.
 CPC .......... *B60R 25/005* (2013.01); *B60R 25/003* (2013.01); *B60R 25/083* (2013.01); *E05B 13/001* (2013.01); *E05B 17/14* (2013.01); *B60R 2325/30* (2013.01)

(58) Field of Classification Search
 CPC ...... E05B 13/00; E05B 13/001; E05B 17/14; E05B 17/142; B60R 25/002; B60R 25/003; B60R 25/005; B60R 25/006; B60R 25/007; B60R 25/08; B60R 25/083; B60R 25/023
 See application file for complete search history.

(56) References Cited

U.S. PATENT DOCUMENTS

| | | | | |
|---|---|---|---|---|
| 1,579,395 A | * | 4/1926 | Rohm | B60R 25/005 70/199 |
| 1,634,583 A | * | 7/1927 | Kissinger | B60R 25/007 70/200 |
| 4,076,095 A | * | 2/1978 | Adamski | B60R 25/005 180/287 |
| 4,333,326 A | * | 6/1982 | Winters | B60R 25/005 70/203 |
| 4,549,625 A | * | 10/1985 | Tindall | B60K 35/00 180/90 |
| 4,888,968 A | * | 12/1989 | Azvedo | B60R 25/007 180/90 |
| 5,040,387 A | * | 8/1991 | Knott, Jr. | B60R 25/005 70/202 |
| 5,094,092 A | * | 3/1992 | Hsieh | B60R 25/005 70/199 |
| 5,282,373 A | * | 2/1994 | Riccitelli | B60R 25/005 70/199 |
| 5,735,147 A | * | 4/1998 | Cattanach | B60R 25/08 137/382 |
| 5,842,364 A | * | 12/1998 | Oliver | B60R 25/005 188/265 |
| 5,921,116 A | * | 7/1999 | Goldenberg | B60R 25/005 70/18 |
| 5,950,463 A | * | 9/1999 | Glazier | B60R 25/005 403/319 |
| 6,681,904 B1 | | 1/2004 | Hosford | |
| 6,732,556 B1 | * | 5/2004 | Russell | B60R 25/006 70/163 |

* cited by examiner

*Primary Examiner* — Christopher Boswell
(74) *Attorney, Agent, or Firm* — Southeast IP Group, LLC.; Thomas L. Moses

(57) ABSTRACT

A locking system for a golf cart and the like vehicle having a brake pedal and a speed control pedal located at a floor area is disclosed which comprises a moveable locking device adapted for installation at said floor area of said vehicle having a lock position and an unlock position. The locking device has a locking rod for maintaining the brake pedal down in a braking position, and which maintains the control pedal up in an inoperable position in the locked position, when installed, to disable the operation of the golf cart. The locking rod can be moved to the unlocked position when installed allowing said brake pedal to rise and become operable, and said control pedal to be moved downward rendering the vehicle operable. The vehicle is disabled in the locked position to prevent unauthorized use and theft of the vehicle.

20 Claims, 7 Drawing Sheets

GOLF CART LOCKING SYSTEM

The invention relates to a manual system for locking a golf cart and the like vehicles to prevent unauthorized use.

BACKGROUND OF THE INVENTION

The use of golf carts and other four wheel vehicles built on similar chassis have become increasingly popular both for golf and other recreation and transportation uses. The vehicles have been dressed up with additional seats, tops, sides and other luxuries. The vehicles are used for recreation and transportation at resorts and communities, and even in neighborhoods, where permitted. The use of the vehicles is typically controlled by a key switch. However, the key switch is often left in the vehicles when they are in use and when left unattended for periods of time. Even when the vehicles are parked with the key removed, it is relatively easy to wire the vehicles to start. Immobilizing systems have been provided to render the vehicle inoperable when not in use. Electrical and mechanical systems have been proposed for disabling a golf cart and similar vehicles. For example, U.S. Pat. No. 6,681,904 discloses a golf cart anti-theft device for locking the brake pedal in the depressed position, including a solenoid member which extends to wedge the brake pedal in an inoperable position. However, the electrical systems are susceptible to the same problem as the key switch, that is, they can be disabled by manipulating the wiring, and mechanical systems have typically been relatively complicated.

Accordingly, an important object of the present invention is to provide a manual locking system which is simple and easy to use to prevent the unauthorized use of a golf cart type vehicle.

Another object of the present invention is to provide a simple and reliable mechanical locking system for a golf cart and the like vehicle which can be added as an aftermarket system, or provided on new vehicles.

SUMMARY OF THE INVENTION

The above objectives are accomplished according to the present invention by providing a locking system for a golf cart and the like vehicle which includes a brake pedal and a speed control pedal, and may include a key switch locking panel with optional storage compartments. The system includes a moveable locking device carried on a floor area of the golf cart having a lock position and an unlock position. The system may also include a flip-panel locking mechanism to prevent unwanted access to the key switch.

The locking device preferably includes a locking rod having a first section which extends over the brake pedal to maintain the brake pedal in a braking position, and a second section which extends under the control pedal to prevent downward movement of the control pedal in the locked position to disable the operation of the golf cart. The locking device can be moved to the unlocked position so that the brake pedal can be released from the braking position and become operable, and the control pedal is released so that it can moved downward and become operable. In this manner, the golf cart is disabled in the locked position to prevent unauthorized use or theft of the golf cart. In the illustrated embodiment, the locking device includes a first pivot disposed adjacent the brake pedal and a second pivot disposed adjacent said control pedal, and further includes a locking rod having a first arm carried by the first pivot and a second arm carried by the second pivot whereby the locking device may be pivoted between the locked and unlocked positions. The locking rod has a first leg on a first end of said rod and a second leg on a second end of said rod, wherein the first and second arms are integral with said first and second legs and carried by said first and second pivots, respectively. First and second brackets are affixed to the floor area of the vehicle to support the first pivot and second pivot. A lock tab may be affixed to the locking device, and a complementary lock member may be affixed on the first bracket whereby the lock tab and lock member may be locked together to prevent movement of the locking device.

The optional key switch locking mechanism preferably includes a bracket affixed to the dashboard of the vehicle, directly over the key switch with an opening allowing access to the key switch. A front panel is affixed to the bracket using a hinge or other suitable mechanism allowing the panel to flip open or closed with relation to the bracket. The key switch locking mechanism includes a locking means; preferably, a locking tab affixed to the bracket and a slot present on the front panel. A padlock, or similar locking means, can be inserted through the locking tab to secure the front panel in the closed, locked position, thereby preventing access to the key switch. When the front panel is in the open, unlocked position, the key switch is accessible for operation of the vehicle.

Another embodiment of the key switch locking mechanism may further include a housing with a front facing opening positioned over the key switch, allowing for storage compartments on either or both sides of the key switch. In a preferred embodiment, the housing is divided into three compartments such that a center compartment allows full access to the key switch, and the compartments on either side of the key switch may include a front cover permanently affixed to the front facing edge of the housing, the cover extending upward from the bottom edge, partially enclosing the compartments. A front panel may be affixed to the front edge of the housing using a hinge or other suitable mechanism, allowing the panel to flip open or closed with relation to the housing. This front panel may fully enclose the housing when in the closed position, allowing for the secure storage of personal items or the like.

The housing includes a locking means; preferably, a locking tab affixed to one of the partial front covers and a slot present on the front panel. A padlock, or similar locking means, can be inserted through the locking tab to secure the front panel in the closed, locked position. When in the open, unlocked position, the key switch is accessible, and one may place items to be stored in the compartments. When in the closed position, the front panel may be locked thereby blocking access to the key switch and securing possessions in the compartments.

DESCRIPTION OF THE DRAWINGS

The invention will be more readily understood from a reading of the following specification and by reference to the accompanying drawings forming a part thereof, wherein an example of the invention is shown and wherein.

DESCRIPTION OF A PREFERRED EMBODIMENT

Figure 1:
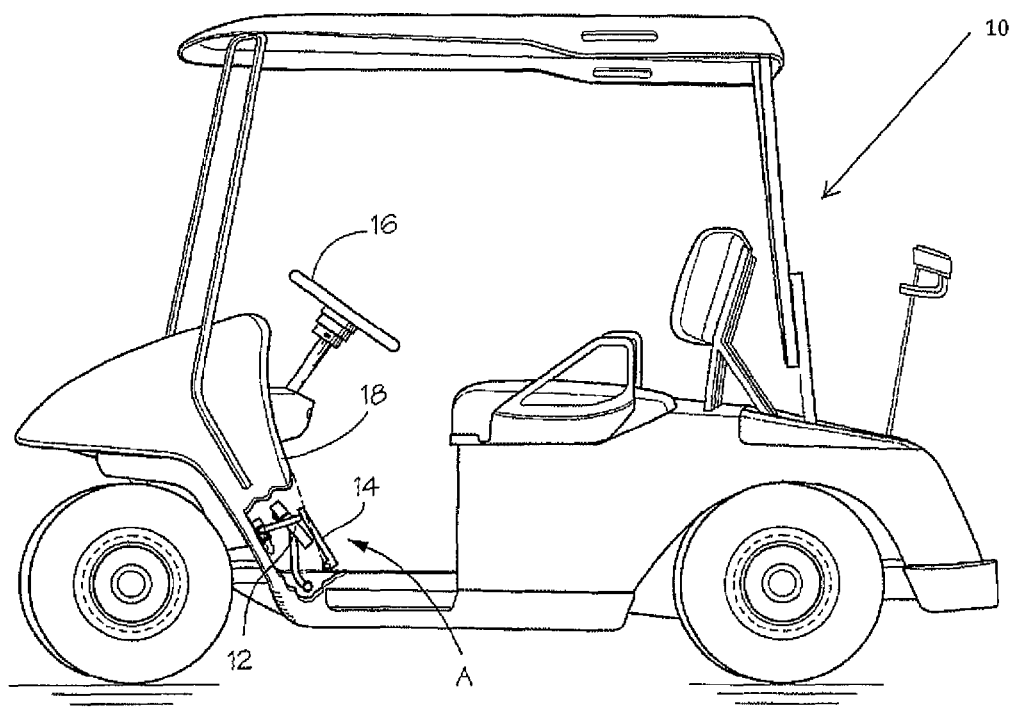
FIG. 1 illustrates a golf cart incorporating a golf cart locking system constructed according to the invention.

Referring now to the drawings, the invention will be described in more detail.

Referring to FIG. 1, golf cart 10 is illustrated as incorporating a manual golf cart locking system, designated generally as A, constructed according to the present invention. A typical golf cart includes a brake pedal 12 and a gas or electric control pedal 14 below the steering wheel 16 at the driver position.

Figure 2:
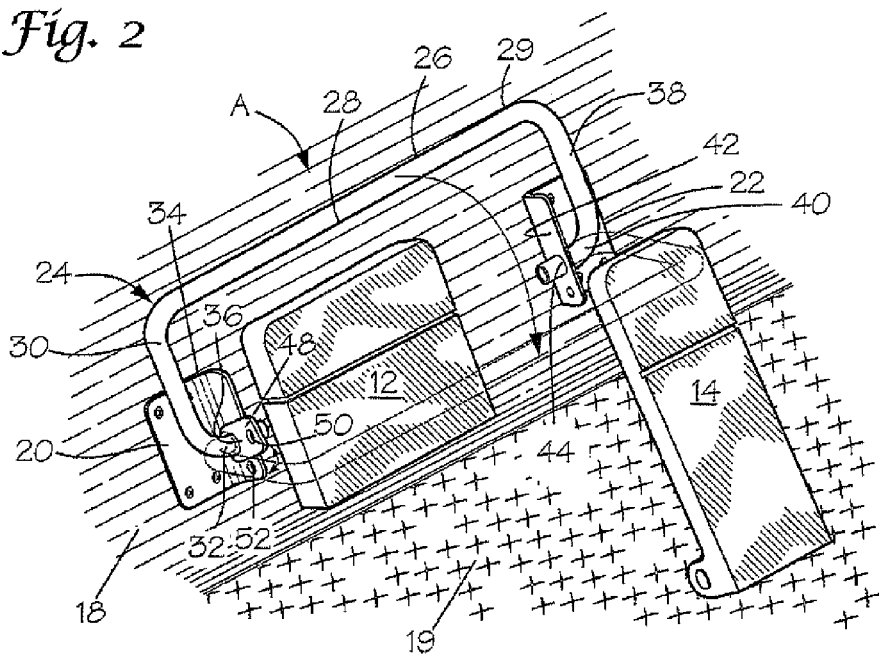
FIG. 2 is a perspective view illustrating the golf cart locking system of FIG. 1 in an unlocked position.
Figure 3:
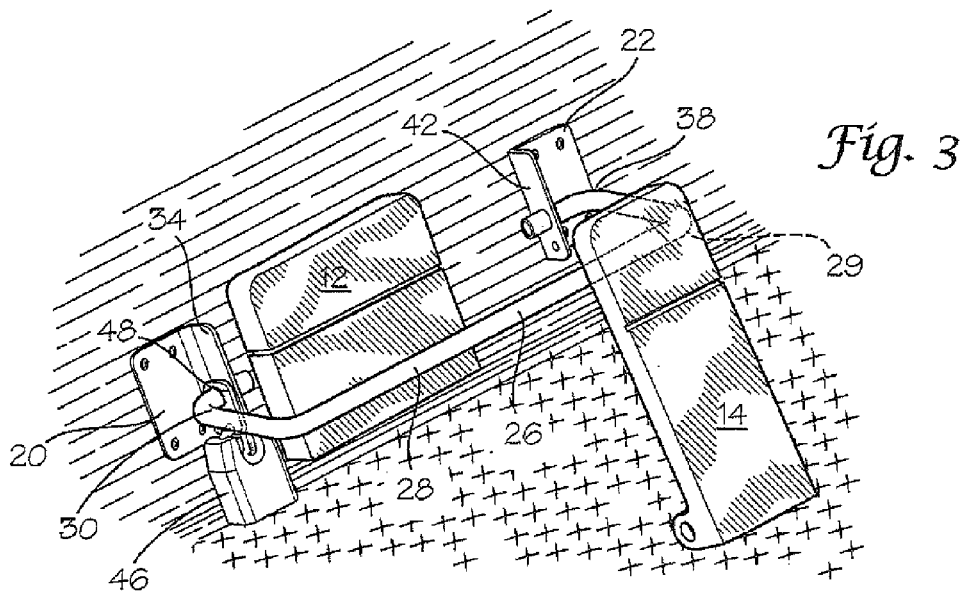
FIG. 3 is a perspective view of the golf cart locking system of FIG. 1 shown in a locked position.

Referring to FIGS. 2 and 3, it can best be seen that the locking system A includes a first attachment bracket 20 attached to a floor area including floor 19 and floor wall 18 of the vehicle, and a second bracket 22 secured to the floor area. A locking device 24 includes a locking rod 26 having a first section 28 lying over the brake pedal 12 and a second section 29 underlying control pedal 14. Locking device 24 includes a first arm 30 integral with rod 26 terminating in an inwardly bent arm 32. First bracket 20 includes a bent L-shaped flange 34 having a pivot opening 36 which receives bent arm 32. Similarly, a second arm 38 is integral with the locking rod which terminates in an inwardly bent arm 40. Bracket 22 includes a bent, L-shaped flange 42 having a pivot opening 44 which receives bent arm 40. Thus, the locking device pivots between the locked position and unlocked positions (FIGS. 2 and 3).

Figure 4:
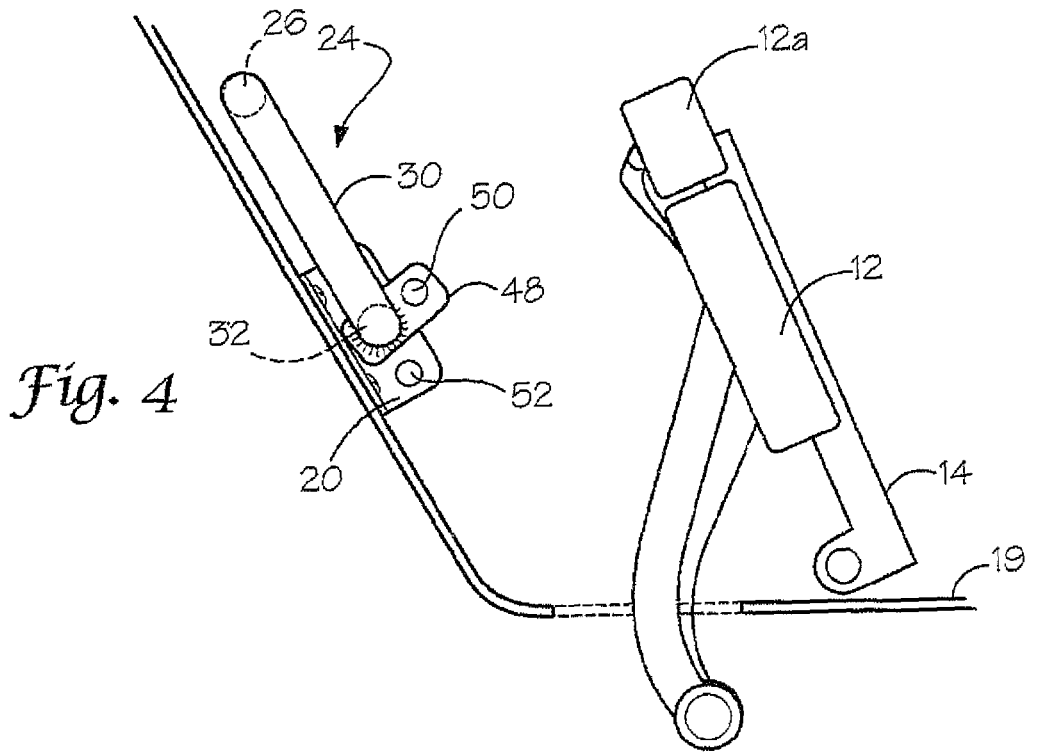
FIG. 4 is a side view illustrating the golf cart locking system according to the invention in an unlocked position.
Figure 5:
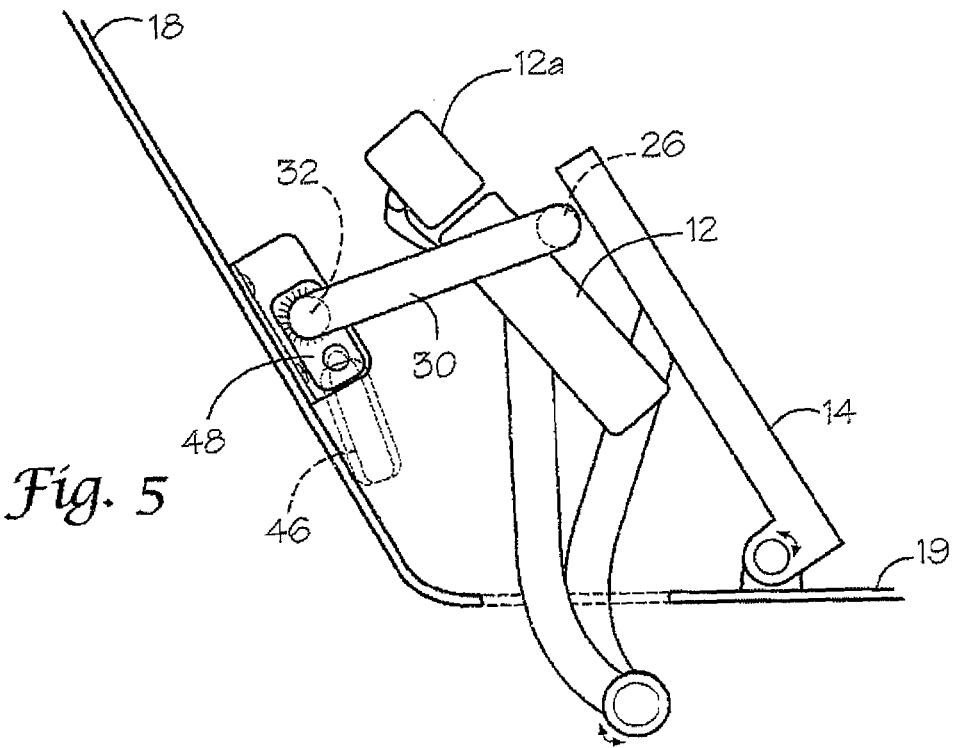
FIG. 5 is a side view illustrating the golf cart locking system according to the invention in a locked position

As can best be seen in FIGS. 2 and 4, when the golf cart locking system is not used locking rod 26 is pivoted up against floor wall 18 of the cart, and the brake pedal 12 is raised up from the floor wall for driving while the locking rod is rotated out of the way. When the golf cart locking system is in the unlocked position for driving, the brake pedal is up. The locking rod rotates out of the way and rests on the floor wall of the golf cart. In the unlocked position, the brake release 12a is released allowing the brake pedal to rise in order to drive. In the locked position of FIGS. 3 and 5, locking rod 26 extends over brake pedal 12 and it cannot be released. The locking rod extends under the control pedal 14 so it cannot be pressed down. Rod 26 pivots down from the unlocked position to overlie the brake pedal that has been pressed down, and under the gas pedal so that it cannot be pressed down. In the locked position, a means for securing the locking rod in position may be provided by a padlock 46. In this case, a locking tab 48 is affixed by welding or other suitable means to bent arm 32 of the locking rod. When the locking rod is pivoted downward to the locked position, the locking tab 48 includes a lock opening 50 which aligns with a lock opening 52 in the bracket flange 34. With the lock openings 50 and 52 aligned, the padlock may be inserted through the openings and locked to prevent upward movement of the locking rod. The padlock may also be used to lock the locking device in the unlocked position by inserting the padlock into lock opening 52 only.

Figure 6:
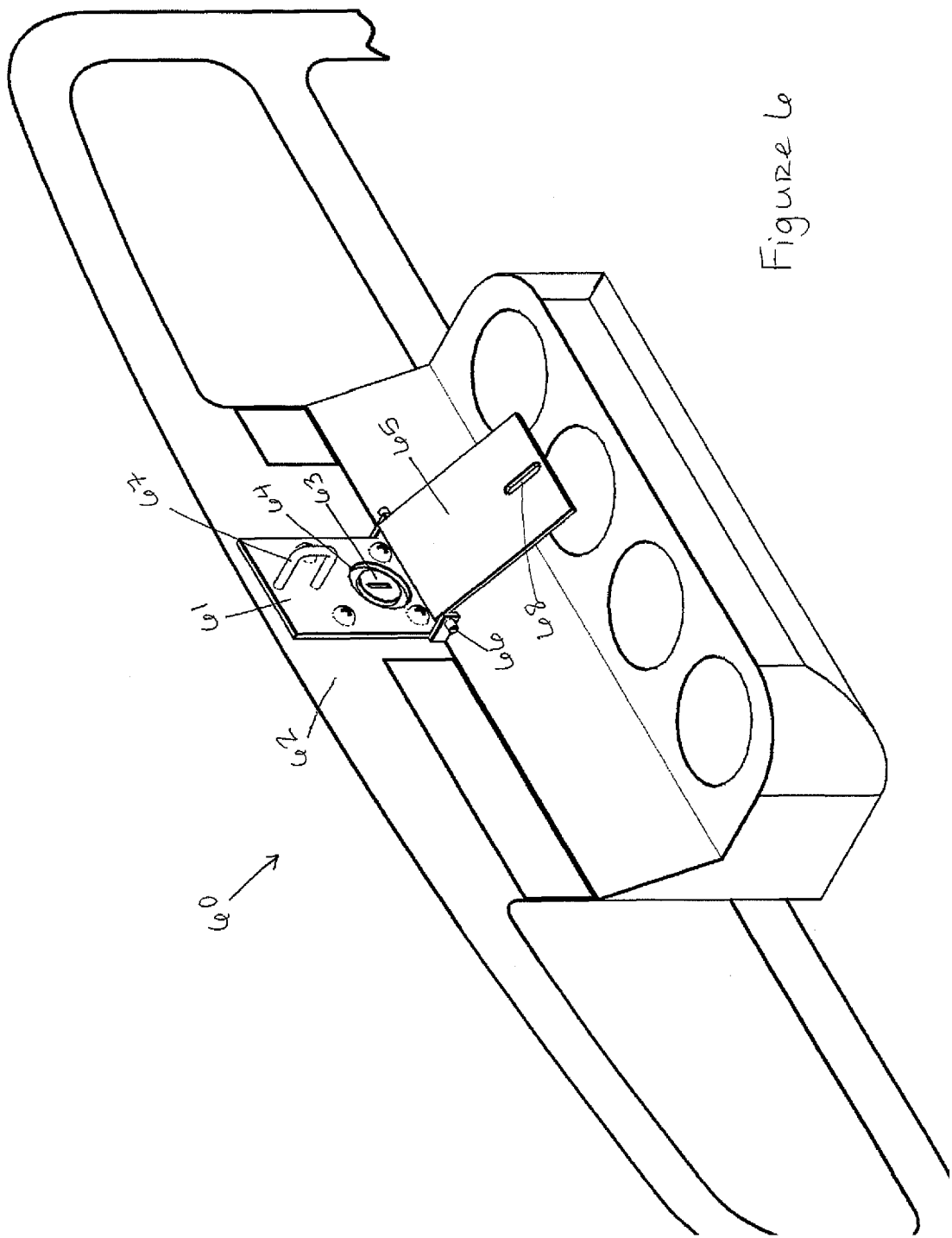
FIG. 6 is a perspective view of the dashboard of a golf cart illustrating the optional key switch locking system in an open, unlocked position

Referring to FIG. 6, the optional key switch locking mechanism 60 preferably includes a bracket 61 affixed to the dashboard 62 of the vehicle, directly over the key switch 63 with an opening 64 allowing access to the key switch 63. A front panel 65 is affixed to the bracket 61 using a hinge 66 or other suitable mechanism allowing the panel 65 to flip open or closed with relation to the bracket 61. A locking tab 67 is affixed to the bracket 61 by welding or other suitable means, while a slot 68 is present on the front panel 65.

Figure 7:
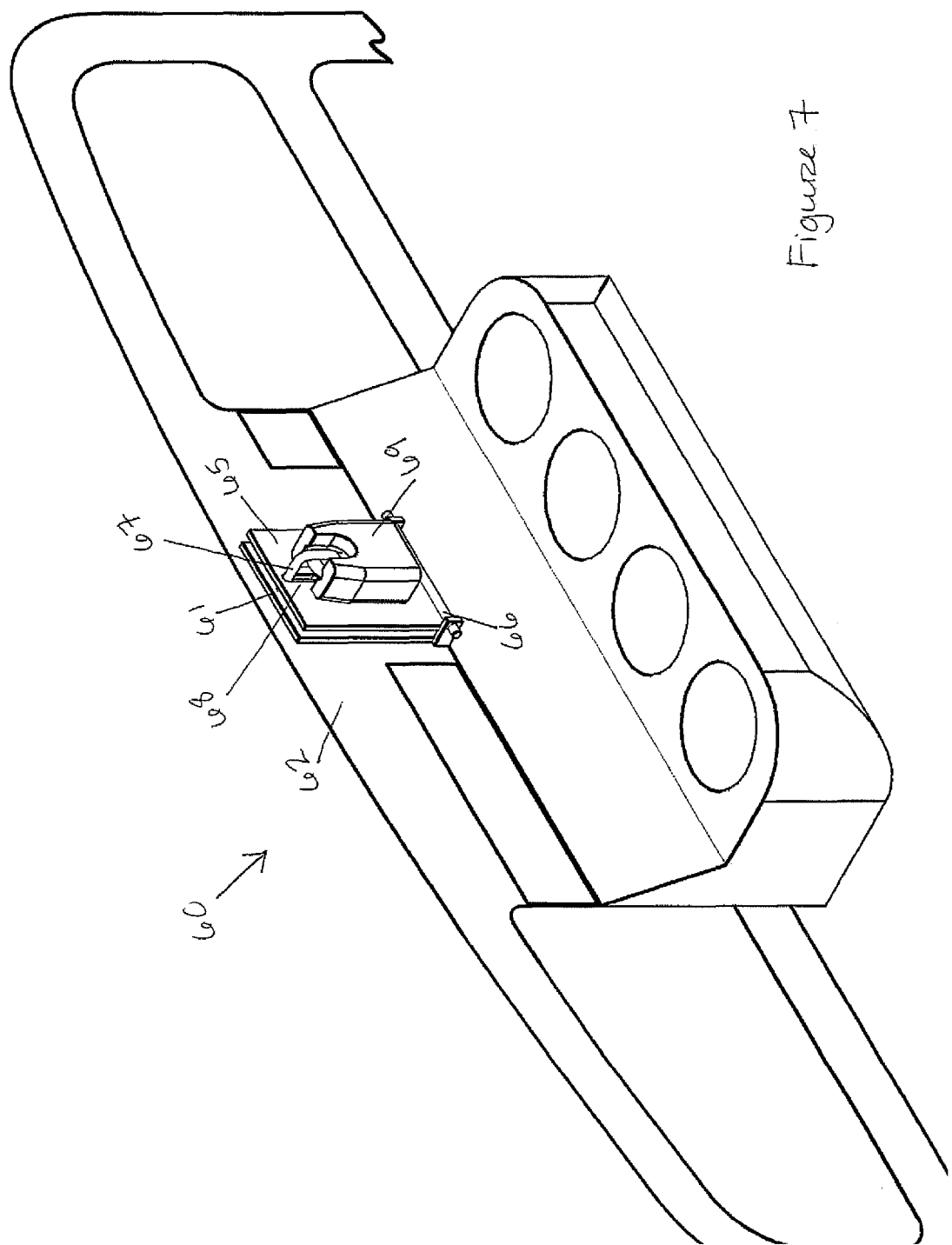
FIG. 7 is a perspective view of the dashboard of a golf cart illustrating the optional key switch locking system in a closed, locked position

As illustrated by FIG. 7, when the key switch locking mechanism 60 is in the closed, locked position, the front panel 65 is flipped up to come in contact with the bracket 61; whereby, the locking tab 67 of the bracket 61 is aligned and inserted into the slot 68 of the front panel 65. A padlock 69, or similar locking means, can be inserted through the locking tab 67 to secure the front panel 65 in the closed, locked position, thereby preventing access to the key switch 63.

Figure 8:
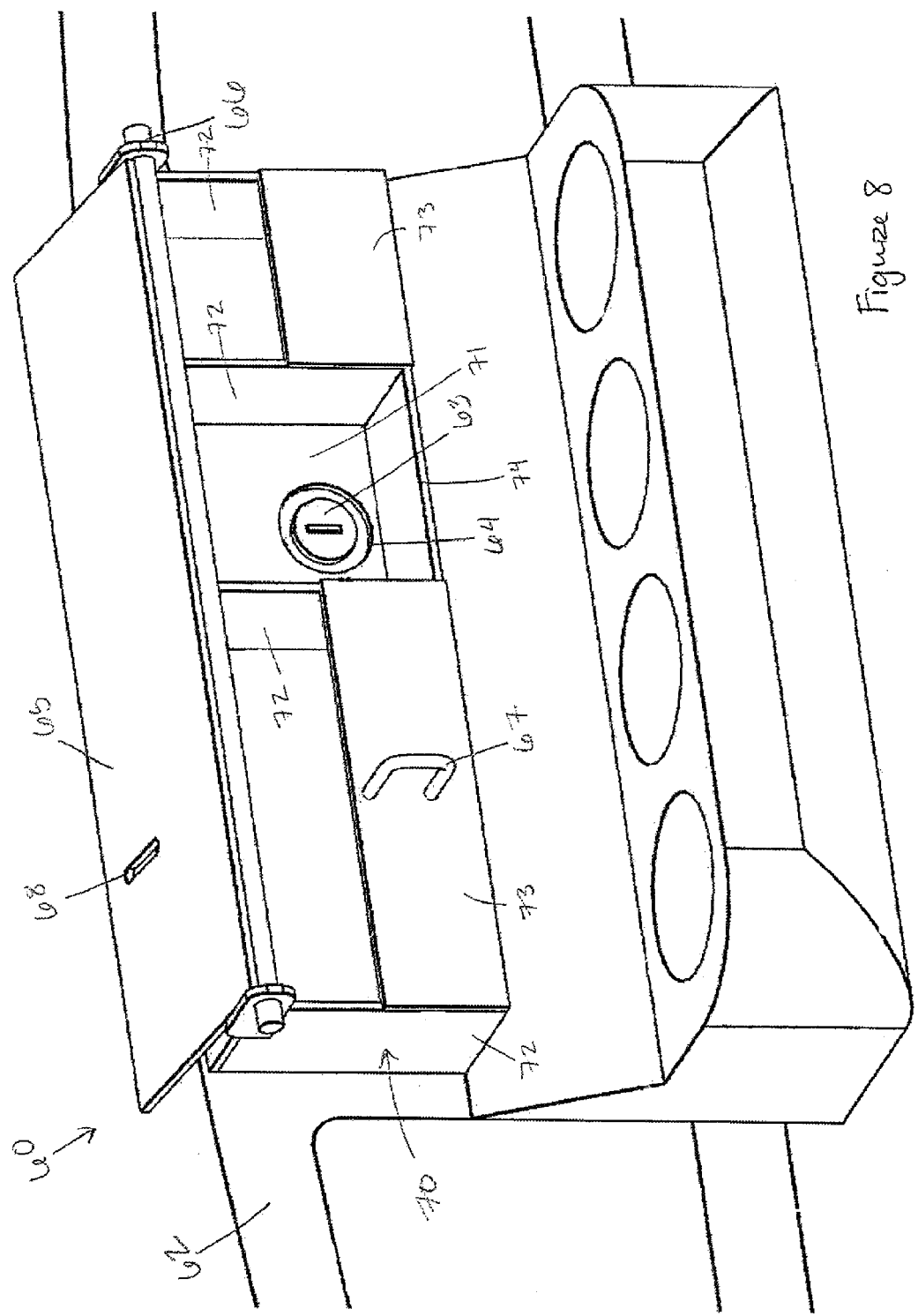
FIG. 8 is a perspective view of the dashboard of a golf cart illustrating the optional key switch locking mechanism with storage compartments in an open, unlocked position

Referring to FIG. 8, the optional key switch locking mechanism 60 may include an open-faced housing 70 positioned over the key switch 63 and affixed to the dashboard 62 of the vehicle, the housing having a rear panel 71 with a circular opening 64 allowing access to the key switch 63. A preferred embodiment may include side panels 72 dividing the housing into multiple compartments. FIG. 8 shows a housing 70 with three compartments, such that the center compartment allows access to the key switch 63, and the compartments on either side of the key switch 63 include a front cover 73 permanently affixed to the front facing edge 74 of the housing 70, extending upward from the bottom edge, thereby partially enclosing the housing and forming storage compartments on either or both sides of the key switch 63. A front panel 65 may be affixed to the front facing edge of the housing using a hinge 66 or other suitable mechanism, allowing the panel 65 to flip open or closed with relation to the housing 70. A locking tab 67 is affixed to the partial front cover by welding or other suitable means, while a slot 68 is present on the front panel 65.

It is to be understood that different embodiments of the housing are possible and may include variations in the number and arrangement of compartments. The housing may include one large compartment or a plurality of compartments. The housing and/or compartment(s) may be partially enclosed, fully open faced, or any combination thereof.

Figure 9:
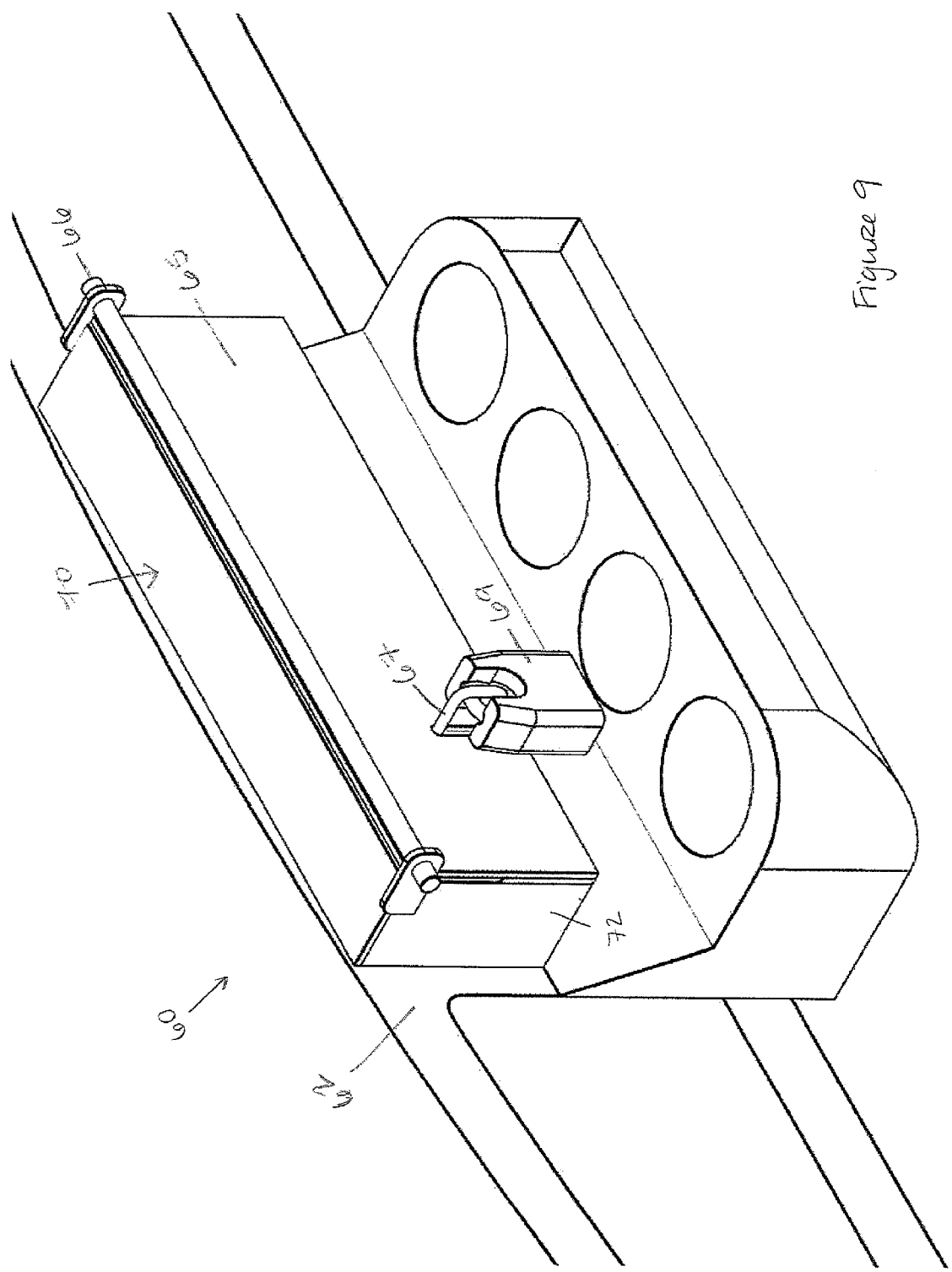
FIG. 9 is a perspective view of the dashboard of a golf cart illustrating the optional key switch locking mechanism with storage compartments in a closed, locked position

As illustrated in FIG. 9, when the key switch locking mechanism 60 is in the closed, locked position, the front panel 65 is flipped up to come in contact with the front facing edge of the housing 70. In this position, the locking tab 67 on the front cover of the storage compartment is aligned and inserted into the slot 68 of the front panel 65. A padlock 69, or similar locking means, can be inserted through the locking tab 67 to secure the front panel 65 in the closed, locked position, thereby preventing access to the key switch 63 and securing possessions in the compartments.

While a preferred embodiment of the invention has been described using specific terms, such description is for illustrative purposes only, and it is to be understood that changes and variations may be made without department from the spirit or scope of the following claims.

What I claim is:

1. A locking system for a golf cart and the like including a brake pedal and a speed control pedal comprising:
   a locking device movably carried and affixed to the golf cart having a lock position and an unlock position;

said locking device having a first section which extends over the brake pedal to depress and hold the brake pedal in a braking position and serve as a parking brake, and a second section which extends under the control pedal to prevent downward movement of the control pedal when the locking device is moved to the locked position so that the operation of the golf cart is disabled;

said locking device being movable to said unlocked position so that the brake pedal can be released from the braking position and become operable, and the control pedal is released to be moved downward and become operable;

whereby the golf cart is disabled in the locked position to prevent unauthorized use or theft of the golf cart.

2. The system of claim 1, including a first pivot disposed adjacent said brake pedal and a second pivot disposed adjacent said control pedal, said locking device including a locking rod having a first arm carried by said first pivot and a second arm carried by said second pivot whereby said locking device may be pivoted between said locked and unlocked positions.

3. The system of claim 2 wherein said locking rod includes a length over which said first section and second section are defined, said locking rod having a first leg on a first end of said rod and a second leg on a second end of said rod, wherein said first and second arms are integral with said first and second legs and carried by said first and second pivots, respectively.

4. The system of claim 3 including a first bracket affixed to a floor area of the golf cart adjacent said brake pedal and a second bracket affixed to said floor area adjacent said control pedal, said first bracket supporting said first pivot and said second bracket supporting said second pivot.

5. The system of claim 3 including a lock tab affixed to said locking device, and a complementary lock member affixed on said first bracket whereby said lock tab and lock member may be locked together to prevent movement of said locking device.

6. The system of claim 1 wherein said locking rod has length over which said first section and second section are defined, said locking rod having a first leg on a first end of said rod and a second leg on a second end of said rod, said first and second legs of said rod being carried by said first and second pivots, respectively, whereby said locking rod may be moved between said locked and unlocked positions.

7. The system of claim 1, further including a key switch locking mechanism positioned over a key switch comprising:
  a bracket affixed to dashboard area of golf cart, said bracket including an opening allowing access to a key switch and a locking tab affixed to said bracket;
  a front panel pivotally affixed to said bracket further including a slot positioned in a location corresponding to said locking tab whereby said bracket and said front panel may be locked together to prevent access to said key switch.

8. The system of claim 1, further including a key switch locking mechanism positioned over a key switch comprising;
  an open-faced housing affixed to dashboard area of golf cart, said housing having a rear panel, said rear panel including an opening allowing access to said key switch;
  a front cover affixed to said housing partially covering said open face and defining an enclosed space thereof;
  a locking tab affixed to said front cover;
  a front panel pivotally affixed to said housing further including a slot positioned in a location corresponding to said locking tab whereby said front panel and said housing may be locked together to prevent access to said compartments and said key switch.

9. A locking system for a golf cart and the like vehicle having a brake pedal and a speed control pedal located at a floor area comprising:
  a locking device adapted for installation at said floor area of said vehicle having a locked position and an unlocked position;
  said locking device having a locking rod with a first section for maintaining the brake pedal down in a braking position, and a second section which maintains the control pedal in an inoperable position so that the locking rod can be moved to the locked position when installed to disable the operation of the golf cart;
  said locking rod being movable to said unlocked position when installed so that the first section releases the brake pedal allowing said brake pedal to rise and become operable, and said second section releases said control pedal so it can be moved down and become operable;
  whereby the golf cart may be disabled in the locked position to prevent unauthorized use of the golf cart.

10. The system of claim 9 wherein said locking rod terminates in a first leg on a first end of said locking rod and a second leg at a second end of said rod.

11. The system of claim 9 wherein said locking rod has a length over which said first section and second section are defined, said locking rod having a first leg on a first end of said rod and a second leg on a second end of said rod, said first and second legs of said rod being carried by said first and second pivots, respectively, whereby said locking rod may be moved between said locked and unlocked positions.

12. The system of claim 11, including a first pivot arm carried by said first leg and a second arm carried by said second leg of said locking rod wherein said first and second arms are pivotally affixed to said floor area.

13. The system of claim 12 including a first bracket affixed to a floor area of the golf cart adjacent said brake pedal and a second bracket affixed to said floor area adjacent said control pedal, said first bracket supporting said first pivot and said second bracket supporting said second pivot about which said locking rod is carried.

14. The system of claim 13 including a lock tab affixed to said first leg, and a complementary lock member on said first bracket whereby said lock tab and lock member may be locked together to prevent movement of said locking device.

15. The system of claim 9 including a lock tab affixed to said locking device, and a complimentary lock member affixed to said floor area whereby said lock tab and lock member may be locked together to prevent movement of said locking device.

16. The system of claim 9, further including a key switch locking mechanism positioned over a key switch comprising:
  a bracket affixed to dashboard area of golf cart, said bracket including an opening allowing access to a key switch and a locking tab affixed to said bracket;
  a front panel pivotally affixed to said bracket further including a slot positioned in a location corresponding to said locking tab whereby said bracket and said front panel may be locked together to prevent access to said key switch.

17. The system of claim 9, further including a key switch locking mechanism positioned over a key switch comprising;

an open-faced housing affixed to dashboard area of golf cart, said housing having a rear panel, said rear panel including an opening allowing access to said key switch;
a front cover affixed to said housing partially covering said open face and defining an enclosed space thereof;
a locking tab affixed to said front cover;
a front panel pivotally affixed to said housing further including a slot positioned in a location corresponding to said locking tab whereby said front panel and said housing may be locked together to prevent access to said compartments and said key switch.

18. A method of disabling a golf cart vehicle and the like having a floor brake pedal and a floor speed control pedal comprising:
providing a movable locking rod having a locked and unlocked position installed on said vehicle;
moving said locking rod to a position extending over the brake pedal and under the speed control pedal in the locked position to disable the vehicle; and
moving said locking rod to an unlock position which does not extend over the brake pedal and under the speed control pedal to permit operation of the vehicle;
whereby unauthorized use and theft of the vehicle is prevented.

19. The method of claim 18, further comprising the steps of:
providing a bracket affixed to dashboard area of golf cart, said bracket including an opening allowing access to a key switch and a locking tab affixed to said bracket;
providing a front panel pivotally affixed to said bracket further including a slot positioned in a location corresponding to said locking tab whereby said bracket and said front panel may be locked together to prevent access to said key switch.

20. The method of claim 18, further comprising the steps of:
providing an open-faced housing affixed to dashboard area of golf cart, said housing having a rear panel, said rear panel including an opening allowing access to a key switch;
affixing a front cover to said housing and partially covering said open face and defining an enclosed space thereof;
affixing a locking tab to said front cover;
providing a front panel pivotally affixed to said housing further including a slot positioned in a location corresponding to said locking tab whereby said front panel and said housing may be locked together to prevent access to said compartments and said key switch.

* * * * *